(12) United States Patent
Davies (10) Patent No.: US 6,687,043 B2
(45) Date of Patent: Feb. 3, 2004

(54) MULTI-FREQUENCY RAMAN AMPLIFIER PUMP SOURCE

(75) Inventor: Michael Davies, Ottawa (CA)

(73) Assignee: MetroPhotonics Inc., Ottawa (CA)

( * ) Notice: Subject to any disclaimer, the term of this patent is extended or adjusted under 35 U.S.C. 154(b) by 10 days.

(21) Appl. No.: 10/100,115

(22) Filed: Mar. 19, 2002

(65) Prior Publication Data

US 2002/0131158 A1 Sep. 19, 2002

Related U.S. Application Data

(60) Provisional application No. 60/276,486, filed on Mar. 19, 2001.

(51) Int. Cl.[7] ................................. H01S 3/00
(52) U.S. Cl. ................. 359/334; 354/341.4; 385/24
(58) Field of Search ................ 354/334, 341.4; 385/24

(56) References Cited

U.S. PATENT DOCUMENTS

| | | |
|---|---|---|
| 5,379,310 A | 1/1995 | Papen et al. |
| 5,396,507 A | 3/1995 | Kaminow et al. |
| 5,666,374 A | 9/1997 | Weber |
| 5,881,079 A | 3/1999 | Doerr et al. |
| 6,055,250 A | 4/2000 | Doerr et al. |
| 6,456,756 B1 * | 9/2002 | Mead et al. .................. 385/24 |

* cited by examiner

*Primary Examiner*—Mark Hellner
(74) *Attorney, Agent, or Firm*—Freedman & Associates (57) ABSTRACT

In accordance with the present invention a multifrequency Raman pump laser cavity is disclosed comprising of an angularly dispersive element optically coupled to a shared waveguide terminated in a partially reflecting facet; a plurality of laser diode sources for radiating at frequencies for Raman amplification each for providing laser light at a different frequency and spatially oriented in relation to the angular dispersive element such that light emitted from each source is reflected from the angularly dispersive element toward a same output port; at least two partially reflecting coating for forming a laser cavity therebetween wherein the grating is within the laser cavity or defines a boundary thereto.

21 Claims, 7 Drawing Sheets

Prior Art

MULTI-FREQUENCY RAMAN AMPLIFIER PUMP SOURCE

This application claims benefit from U.S. Provisional Application No. 60/276,486 filed Mar. 19, 2001.

FIELD OF THE INVENTION

This invention relates to Raman optical amplifiers, and more specifically to a multifrequency Raman amplifier pump source with a variable output spectral gain.

BACKGROUND OF THE INVENTION

In a conventional long haul optical network it is often necessary to traverse distances of over one hundred kilometers between optical nodes. In order to propagate optical signals over such long distances it is necessary to provide energy to the optical signals. Typically this amplification is done with an erbium doped fibre amplifier (EDFA). A typical EDFA includes a pump source and length of erbium doped fibre. The pump source supplies energy to the erbium doped fibre. When an optical signal propagates within a region of erbium doped fibre during pumping, the erbium doped fibre will transfer some energy to the optical signal. Thus, in an EDFA, the amplification takes place within the length of erbium doped fibre.

One alternative to the EDFA that has gained popularity is the use of a Raman effect amplifier. Unlike an EDFA, a Raman effect amplifier uses the optical fibre to provide energy to the optical signal. These devices are generally more costly than EDFAs however Raman amplification is often used in undersea applications because it allows longer transmission distances that conventional EDFAs. In operation, the Raman pump provides a pump signal that propagates in a direction opposite the propagation of the optical signal that it is amplifying. When using an EDFA to amplify an optical signal, the gain provided to the optical signal is achieved in a short length—usually a few meters —of erbium doped fiber. Since Raman amplifiers use conventional optical fibre as a gain medium and the amplification is typically achieved over a distance of many kilometers. In some applications it is known to provide an EDFA and a Raman amplifier together. In this case, the Raman amplifier amplifies the optical signal prior to reaching the EDFA. The EDFA then boosts the optical signal again. This arrangement takes advantage of amplification from the comparatively inexpensive EDFA while still retaining some of the benefits of the additional distance provided by Raman amplification. In Raman effect amplification, light traveling within a medium is amplified by the presence of lower wavelength pump light traveling within the same medium. Typically maximum gain in silica fibers occurs at a frequency 13 THz lower than a relatively narrow Raman pump frequency band. The gain medium is either the transmission fiber itself, or a separate fiber optimized for Raman amplification.

Each Raman pump laser has a relatively narrow gain spectrum associated with it in the C band. Therefore a plurality of Raman lasers, spaced at fixed frequencies, are required to obtain continuous gain in the C band, as is obtained by using an EDFA. Additionally, a Raman amplifier will also allow the C band to be widened by supporting optical wavelength channels proximate the C band but having shorter wavelengths. Conventional methods of broadening the amplification in the C band comprise using a plurality of pump lasers at a spaced frequency coupled to a multiplexer such that a continuous gain spectrum is obtained within the gain fiber. Clearly, Raman effect amplifiers are very costly due to the number of required pump lasers and the components used to support the various lasers. In comparison a conventional EDFA uses one or a few pump lasers, depending on the application.

For conventional pump sources, laser diodes are coupled to optical fibers and require special lenses. The optical mode leaving a laser diode is elliptical in shape. In order to minimise the insertion loss between the laser diode chip and the optical fiber the elliptical mode is transformed to a circular mode prior to being provided to the fiber. This requires costly lenses for the mode conversion. Distributed feedback (DFB) lasers are useful for pump sources because of the frequency stabilizing grating used for feedback in to the cavity, however these lasers are expensive because a grating is either assembled within the laser cavity or attached externally to the laser after pigtailing.

Prior art U.S. Pat. No. 6,055,250 entitled "Multifrequency Laser Having Reduced Wave Mixing" details the use of a plurality of multifrequency sources coupled to a shared waveguide grating in order to achieve a multi frequency output such that any mixing signals on the output do not overlap in frequency. It is a form of a commonly referred to MAGIC—multi-stripe array grating in a cavity—laser. This patent does not teach the use of the integrated multifrequency lasers for EDFA or Raman pumping amplifications.

It would be advantageous to manufacture an inexpensive laser source coupled directly to a waveguide device such that frequency stabilization feedback comes from a single shared grating instead of a plurality of gratings within each laser.

It would be advantageous to provide a single laser cavity having multiple laser diode sources within the cavity such that each of the laser diodes obtains frequency feedback from a same grating, whereby the intensity of each source is variable in such a manner as to shape the gain spectrum.

It would be beneficial to produce an inexpensive Raman effect amplifier.

SUMMARY OF THE INVENTION

In accordance with the present invention a multifrequency Raman pump laser cavity is disclosed comprising of an angularly dispersive element optically coupled to a shared waveguide terminated in a partially reflecting facet; a plurality of laser diode sources for radiating at frequencies for Raman amplification each for providing laser light at a different frequency and spatially oriented in relation to the angular dispersive element such that light emitted from each source is reflected from the angularly dispersive element toward a same output port; at least two partially reflecting coating for forming a laser cavity therebetween wherein the angularly dispersive element is within the laser cavity or defines a boundary thereto.

Similarly, the invention provides a multifrequency EDFA pump laser cavity comprising, a plurality of light sources having a gain medium associated therewith for radiating at frequencies for EDFA amplification each for providing laser light at a different frequency and spatially oriented in relation to an angular dispersive element such that light emitted from each source is reflected from the angular dispersive element toward a same output port; and, at least two partially reflecting coatings for forming a laser cavity therebetween wherein the angular dispersive element is one of within the laser cavity and defining a boundary thereto wherein at least two of the plurality of laser diode sources, the angular dispersive element and the at least two partially reflecting coatings are disposed on a same substrate.

The invention also describes a multifrequency pump laser cavity comprising, a plurality of light sources having a gain medium associated therewith for radiating at a first set of frequencies for EDFA amplification and a second set of frequencies for Raman amplification each for providing laser light at a different frequency and spatially oriented in relation to an angular dispersive element such that light emitted from each source is reflected from the angular dispersive element toward a same output port; and, at least three partially reflecting coatings for forming a laser cavity therebetween wherein the angular dispersive element is one of within the laser cavity and defining a boundary thereto wherein at least two of the plurality of laser diode sources, the angular dispersive element and the at least three partially reflecting coatings are disposed on a same substrate.

BRIEF DESCRIPTION OF THE DRAWINGS

An embodiment of the invention will now be described with reference to the drawings in which.

DETAILED DESCRIPTION OF THE INVENTION

Figure 1:
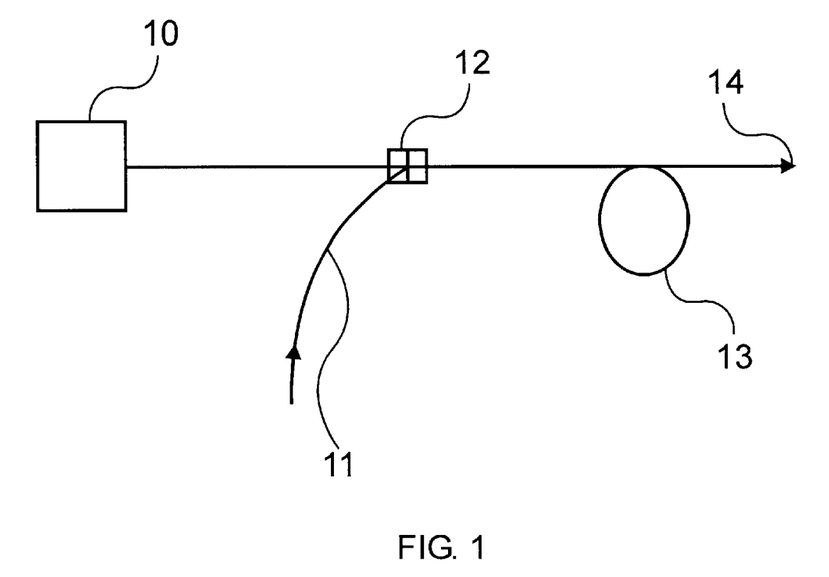
FIG. 1 is a simplified diagram of a Raman amplifier.

Referring to FIG. 1, a Raman amplification system is shown. Light from a laser pump source 10 is optically coupled into an optical fiber, optically coupled to an input port of a thin film filter WDM 12. An optical signal 11 is also optically coupled to the WDM 12. The thin film filter WDM combines the laser pump source and the optical signal into a common output fiber 13 having an output port 14. The common output fiber acts as a medium for optical gain between the pump laser and the optical signal. Due to the Raman effect gain occurs in the optical signal as a result of laser intensity within the fibre according to the known Raman effect.

Raman pumping with a monochromatic laser source results in a gain at a wavelength that is about 13 THz lower in frequency from pumping laser frequency. As a consequence, for a single pump laser the optical signal experiences only a narrow band gain. Therefore, there is a need to have a plurality of pump lasers with different wavelengths in order to obtain gain over the bandwidth of an optical signal having broader bandwidth.

Figure 2:
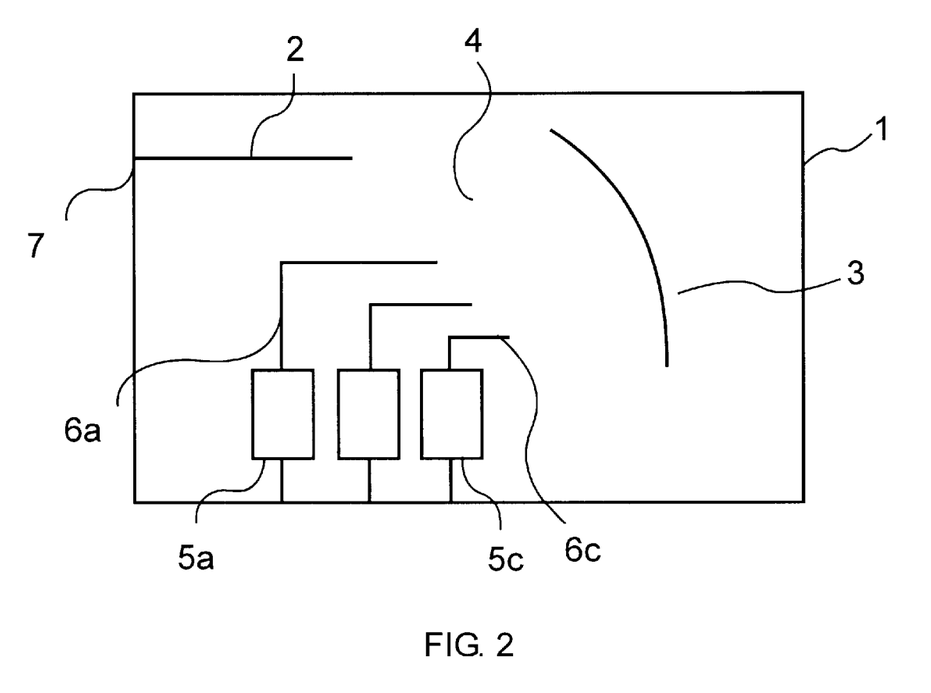
FIG. 2 is a simplified diagram of a Raman amplifier Pump source according to the invention.

Referring to FIG. 2, a waveguide grating multiplexer device 1 is shown for multiplexing a plurality of multi frequency laser diode sources 5a to 5c for the purpose of creating a broadband Raman amplification pump source. Laser diodes 5a through 5c are optically coupled to each of the waveguides 6a to 6c. The waveguides are optically coupled through a slab region 4 to a first surface of an angular dispersive element (ADE) 3. The second surface of the ADE 3 is broadband high reflection coated to reflect the plurality of laser diode frequencies. Light reflecting off of the ADE propagates back into the slab region 4 and optically coupled into a common output waveguide 2. The output waveguide terminates in a partially reflecting coating on the end facet of the output of the grating multiplexer chip. The partially reflecting coating on the end facet and the diode laser sources define the boundaries of the multifrequency Raman pump laser cavity.

The frequencies of the laser diode sources 5a to 5c are chosen to be suitable Raman pump laser sources corresponding to predetermined wavelength channels. The position of the input waveguides 6a to 6c in spatial relation to the ADE, and the configuration of the ADE, are arranged such that all inputs from the Raman pump sources input to the waveguides reflect off the ADE and couple into a common output waveguide 2. Wavelength stability for each laser diode source is provided by partially reflected light at the frequency of the laser diode partially reflecting from the partially reflecting coating on the output facet. A single grating therefore acts to stabilize each laser source as part of the Raman pump laser cavity.

Figure 3:
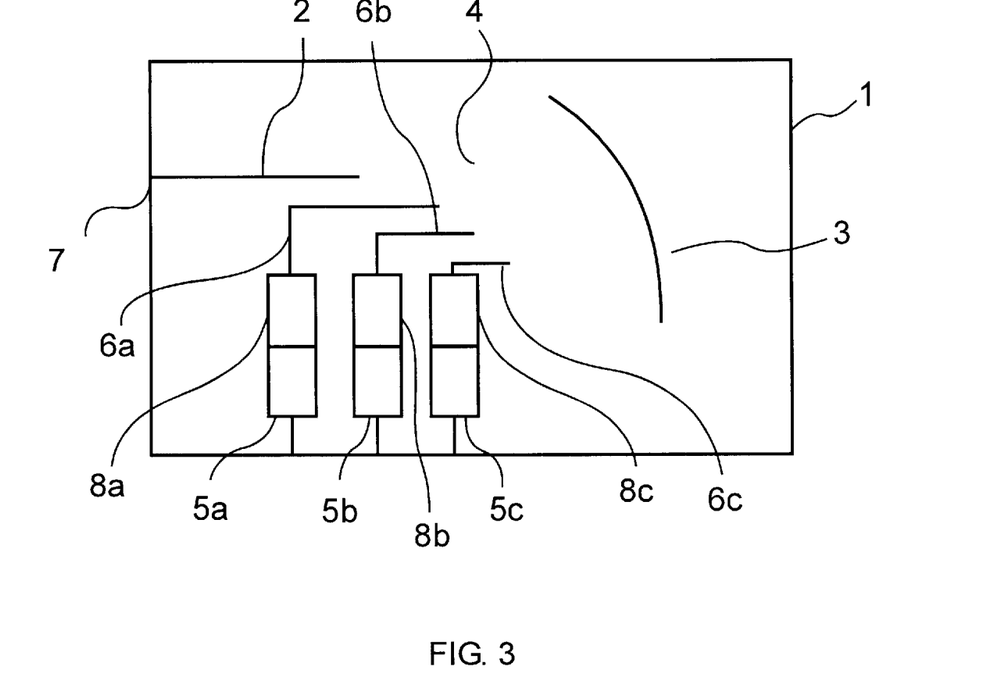
FIG. 3 is a simplified diagram of another Raman amplifier Pump source with variable attenuation for each laser light source.

Referring to FIG. 3, a waveguide grating multiplexer device 1 according to an embodiment of the invention is shown for multiplexing a plurality of multi frequency laser diode sources 5a to 5c for the purpose of creating a broadband Raman amplification pump source with a variable optical attenuator (VGA) on each source to vary the intensity of the sources. Laser diodes 5a through 5c are optically coupled to VOAs 8a to 8c, which are optically coupled to waveguides 6a to 6c. The waveguides are optically coupled through a slab region 4 to a first surface of an angular dispersive element (ADE) 3. The second surface of the ADE 3 is broadband high reflection coated to reflect the plurality of laser diode frequencies. Light reflecting off of the ADE propagating back into the slab region 4 is optically coupled into a common output waveguide 2. The output waveguide terminates in a partially reflecting coating on the end facet of the output of the grating multiplexer chip. The partially reflecting coating on the end facet and the diode laser sources define boundaries of the multifrequency Raman pump laser cavity. Having a fixed current applied to each of the laser diodes does not allow for individual control of intensity of each of the pump sources. With the addition of a VGA associated with each pump source the magnitude of light passing through the VOA is precisely controllable. This results in a configurable gain spectrum on the optical signal that is output.

Figure 4:
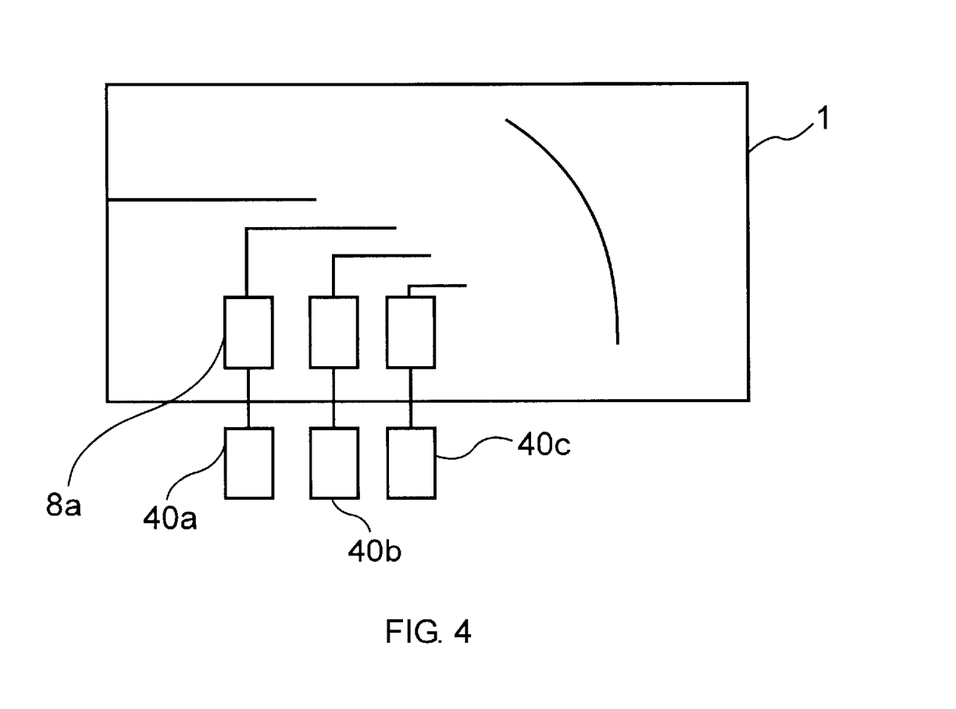
FIG. 4 is a simplified diagram of another Raman amplifier Pump source with external laser light sources for providing the optical power thereto.

Referring to 4, a waveguide grating multiplexer device 1 according to an embodiment of the invention is shown for multiplexing a plurality of multi frequency laser sources 40a to 40c for the purpose of creating a broadband Raman amplification pump source with a VGA 8a to 8c on each source to vary the intensity of the sources. External multi frequency laser sources 40*a* through 40*c* are optically coupled to VOAs 8*a* to 8*c*, which are optically coupled to waveguides 6*a* to 6*c*. The waveguides are optically coupled through a slab region 4 to a first surface of an angular dispersive element (ADE) 3. The second surface of the ADE 3 is broadband high reflection coated to reflect the plurality of coupled laser diode frequencies. Light reflecting off of the ADE propagates back into the slab region 4 and is optically coupled into a common output waveguide 2. The output waveguide terminates in a partially reflecting coating on the end facet of the output of the grating multiplexer chip. The partially reflecting coating on the end facet and the partially reflected coating on the input ports coupled to the laser sources define the boundaries of the multifrequency Raman pump laser cavity. Having a fixed current applied to each of the external lasers does not allow for individually controlling the intensity of each of the pump sources. With the addition of a VGA the magnitude of each source is controlled. This results in a configurable gain spectrum on the signal beam output.

Alternatively, each laser is variably powered to vary laser energy intensity. Preferably, as shown, the integrated multiplexer forms a laser cavity for improved broadband pump signal quality.

Figure 5A:
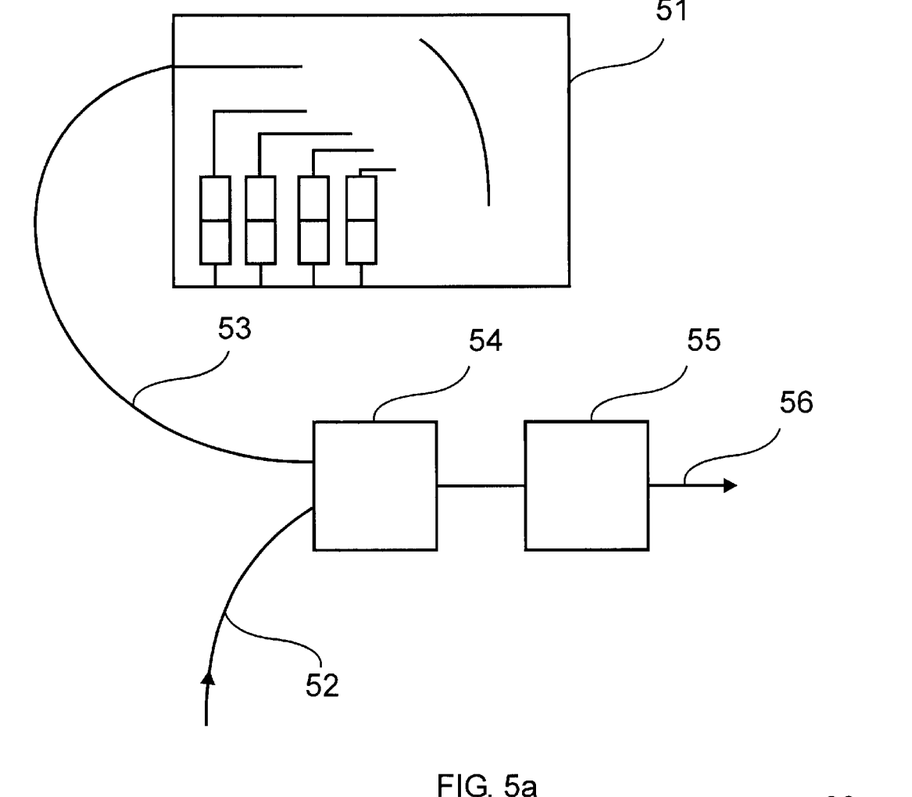
FIG. 5a is a Raman amplifier according to another embodiment of the invention.

Referring to FIG. 5*a*, a multifrequency pump source 51 according to an embodiment of the invention is shown. The pump source 51 comprises a laser for providing light at a plurality of predetermined wavelengths, wherein the intensity of the provided light at each supported wavelength is independently variable in response to external control signals. The pump source 51 is coupled to a Raman amplifier 54. The Raman amplifier typically comprises a length of fiber acting as a gain medium, as well as a wavelength dependent coupler for coupling the input optical signal 52 and the pump optical signal. The amplified signal is optically coupled to a fiber optic network component 55 with a predetermined frequency response. The attenuation on each of the VGA's and the current provided to each of the lasers is chosen in such a manner so as to obtain a flat output frequency response between the input port 52 and the output port 56 after the fiber optic network component. Having a known frequency response of the network component allows for choosing the pump source optical signal frequency in a manner so as to yield a flat output power from the optical components, device or network in terms of frequency.

Figure 5B:
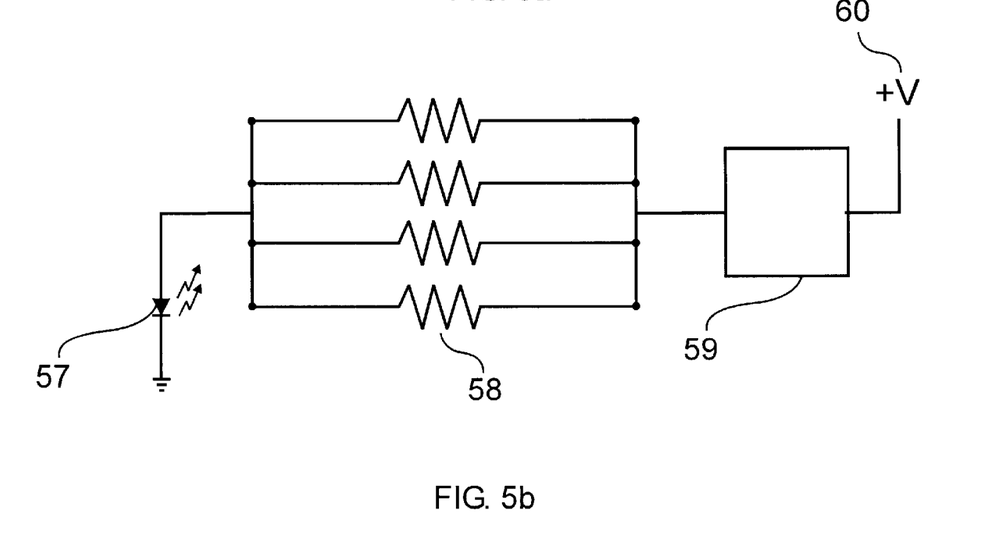
FIG. 5b is an equivalent circuit to a Raman amplifier pump source for use in the invention.

Referring to FIG. 5*b*, a circuit providing configurable fixed optical power from each of a plurality of integrated optical laser sources in the form of diodes 57 is shown. Each diode 57 is driven by a driver circuit 59 through a plurality of parallel resistors 58. Each resistor is coupled to a fuse that is optionally blown during a configuration step. By blowing out a fuse, the path through the associated resistor is open and current does not flow therethrough. As such, an amount of current provided to the diode is configurable to adjust output intensity thereof. As such, different pump signal frequency amplitude curves are achievable with a same pump source but configured differently. This supports spectral shaping during manufacture only.

Figure 6:
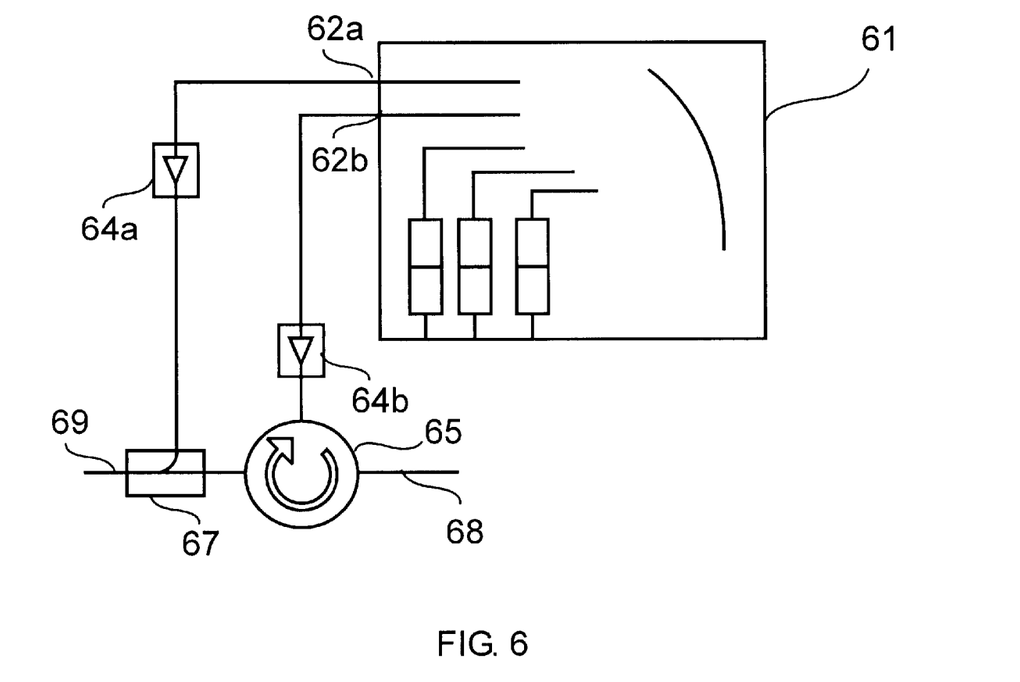
FIG. 6 is a diagram of an assembly according to the invention including a Raman amplifier pump source, a pair of isolators, a circulator and a coupler.

Referring to FIG. 6 an embodiment of the invention is shown featuring a Raman pump source 61 with two output ports 62*a* and 62*b*. A wavelength multiplexed optical signal is provided by waveguide 68 and propagates to waveguide 69. The wavelength multiplexed optical signal propagated through the circulator 65, through the coupler 67 and into the output waveguide 69. The Raman pump source provides two pump signals. A first pump signals provided from port 62*b* propagates through the isolator 64*b* and into the circulator 65. The circulator directs this pump signal into the input waveguide 68. A second pump signals is provided at output port 62*a* and propagates through the isolator 64*a*. The pump signal continues propagating into the coupler 67 and into the output waveguide 69. The embodiment is a simple assembly that provides Raman pump signals in both directions from a single Raman pump source. This allows Raman pump sources to be spaced further apart without incurring the additional costs of having two separate Raman pump sources. In this embodiment the coupler 67 is a 3 dB coupler however other couplers will work in this assembly. The isolators 64*a* and 64*b* are provided to ensure that optical signals provided on waveguides 68 and 69 do not propagate into the Raman source 61.

Figure 7:
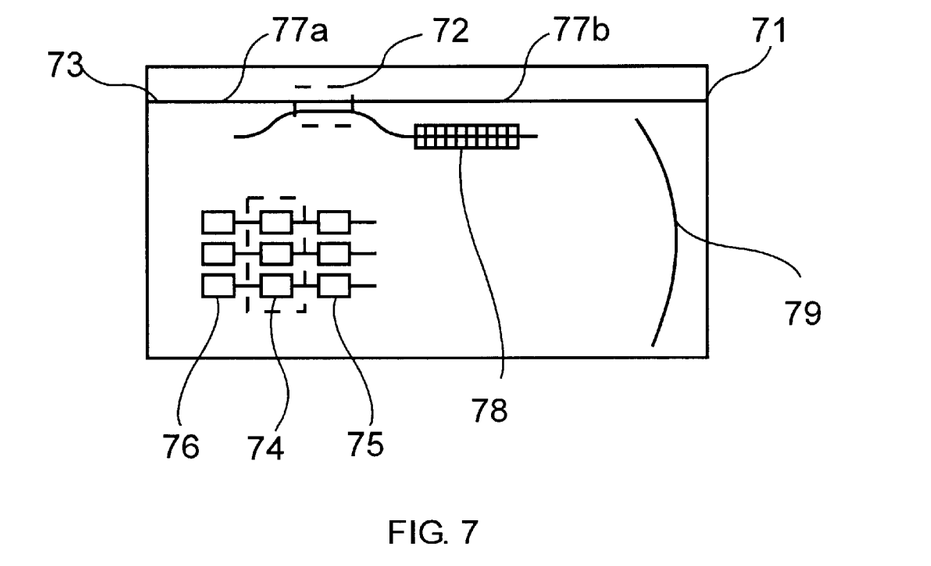
FIG. 7 is a diagram of a Raman amplifier pump source integrated on a same substrate as a coupler according to the invention.

Referring to FIG. 7, an embodiment of the invention is shown. In operation, the input port 73 receives a wavelength division multiplexed optical signal corresponding to the C band. This optical signal is provided to a coupler 72. The coupler provides the optical signal to waveguide 77*b*. From the waveguide 77*b*, the input optical signal it is provided to the output port 71. A second region of the substrate acts as a Raman pump source. A set of sources 74 provide pump signals at predetermined wavelengths. Each source is optically coupled to a VOA 75 and a reflector 76. The VOA 75 controls the intensity of the corresponding pump signal. The pump signals provided from the sources 74 to the VOAs 75 propagate to a wavelength division element 79 where they are wavelength division multiplexed and provided to the partial reflector 78. The optical paths between the partial reflector and the reflectors 76 form laser cavities. A portion of each of the pump signals continues propagating to the coupler 72 and is coupled to waveguide 77*a*. Thus, the laser cavities are provided optically between the partial back reflector 78 and the reflectors 76. Light penetrating the partial back reflector 78 is provided to the input port 73. The coupler has been specifically designed to prevent light within the supported optical communications band from entering the laser cavity. The coupler features a blazed grating that reduces the likelihood of light from the wavelength multiplexed optical signal entering the laser cavity.

Figure 8:
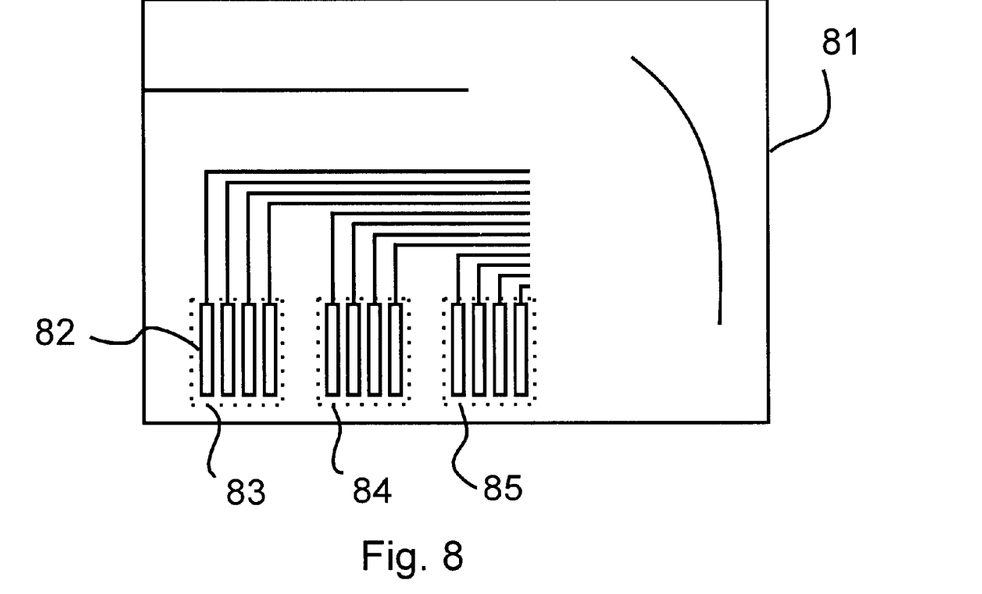
FIG. 8 is a diagram of an optical amplifier pump source according to the invention featuring banks of sources.

Referring to FIG. 8 an embodiment of the invention is shown in which the Raman pump source 81 provides a large number of closely spaced wavelength signals. The Raman pump source 81 has additional laser diodes 82. Each of the laser diodes has a VOA associated with it. In this case a first bank of sources 83 within the Raman pump source 81 is for producing an optical signals at approximately 1420 nm, a second bank of sources 84 is for producing an optical signals at approximately 1440 nm while a third bank of sources 85 is for providing optical signals at approximately 1460 nm. Although the banks of sources produce optical signals at similar wavelengths, each source within the bank produces light having a specific wavelength and no two sources produce light at the same wavelength. In this way, the individual sources produce an optical signal having less optical power than an equivalent single optical source. By maintaining the optical sources at relatively low levels of power output their time to failure is substantially enhanced. Additionally, in the event that one of the sources should fail the others are adjusted to compensate for the failed source. In this way, failure of the sources is both less likely and substantially mitigated. Clearly, the design is easily modified to provide different numbers of banks of sources each supporting different wavelengths.

Optionally the intensity of each laser is variable only upon manufacturing of the pump source. Alternatively, current is controlled in a reconfigurable fashion such that the part is fully reconfigurable in accordance with design requirements and user needs. This supports spectral shaping during manufacture as well as during design, test and maintenance when so desired.

Optionally, a grating with a high diffraction order is used so that the free spectral range of the grating is large enough to contain all the distributed feedback laser wavelengths to be multiplexed together within a band, such that the output of the Raman pump is a continuous spectrum with equal power within the pump band.

Advantageously the wavelengths and power levels for each of the Raman pump lasers are chose in such a manner as to obtain a uniform power gain spectrum in C band.

It will be apparent to one of skill in the art that the advantages of the Raman pump source according to the invention are not limited to only to Raman pump sources. For example, an EDFA uses pump lasers with characteristic wavelengths of approximately 980 nm and 1480 nm. An EDFA typically uses more than just two pump sources. The additional pump sources are provided to maximize the gain without overly compromising the reliability of the pump sources. Unfortunately, providing two optical pumps having substantially equal output wavelengths in an EDFA result in a problem known as "beating".

Figure 9:
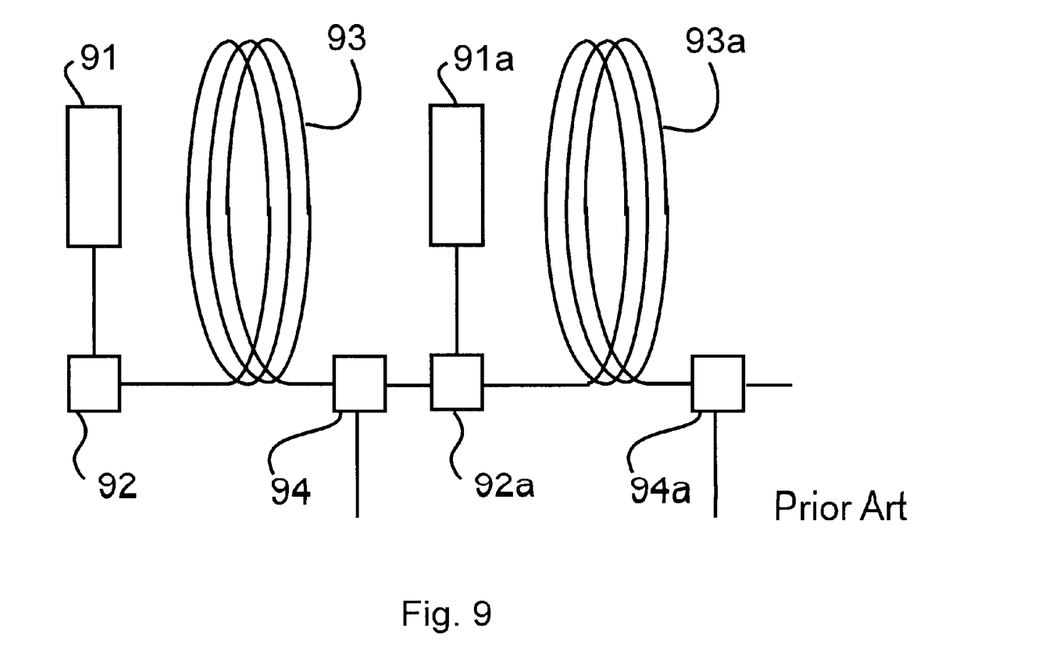
FIG. 9 is a diagram demonstrating the optical path that light propagates along in a prior art EDFA module.

Referring to FIG. 9 a simplified diagram of a conventional EDFA is shown. In this simplified example, an EDFA with two 1480 nm pump sources is described. The pump source 91 provides an optical signal at 1480 nm. The optical signal propagates to a WDM filter 92 that couples it to an erbium doped fibre 93 (EDF). The 1480 nm signal excites the erbium doped fibre 93 and this transfers energy to any optical signal in the C band propagating within the same EDF. As the 1480 nm signal excites the EDF it looses intensity, thus, after propagating a certain length within the EDF it is no longer transferring significant amount of power to the EDF. The 1480 nm optical signal is separated from the EDF with another WDM filter 94. Unfortunately, it is often the case that the single pumping operation is inadequate to transfer the desired amount of power to a C band optical signal. Therefore, another 1480 nm pump 91*a,* WDM couplers 92*a* and 94*a,* and EDF 93*a* are provided to boost the C band optical signal again. It is not uncommon to have even more stages in an EDFA. The components for these stages and the costs associated with assembling them are quite substantial and consequently the finished EDFA is very costly. This description is meant to be illustrative of a conventional EDFA. Typically, isolators are disposed optically proximate the laser sources to prevent optical signals from entering the laser sources. A wide variety of EDFA configurations exist however their design is consistent with FIG. 9. For example, it is also common that an EDFA will incorporate a 980 nm pump stage as well. Additionally, some EDFAs use 1480 nm pump signals that are counter propagating relative to the signal that they amplify.

Figure 10:
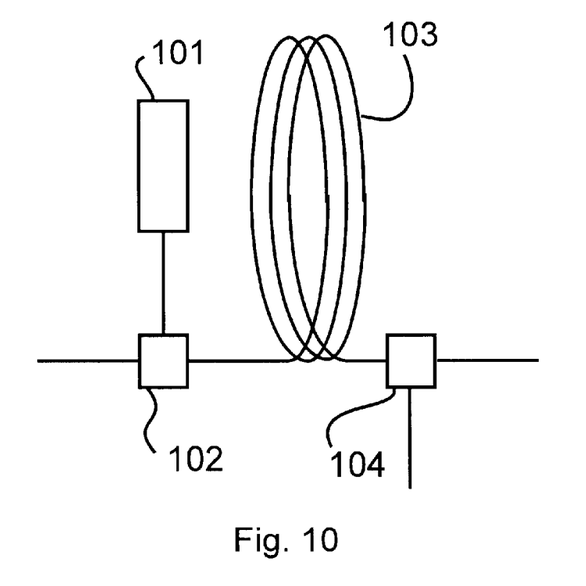
FIG. 10 is a diagram of an EDFA module that features a pump source according to the invention.

Referring to FIG. 10, an EDFA with a pump source according to the invention is shown. Pump source 101 produce light having slightly different wavelengths all near 1480 nm. The pump source is coupled to a WDM filter 102. Light from the pump source 101 propagates through the WDM filter 102 and along the EDF 103, exciting the EDF 103 as it propagates through it. The EDF 103 transfers power to light corresponding to the C band propagating therein. After propagating a predetermined distance within the EDF 103 the 1480 nm pump source signals are separated from the amplified C band signals with another WDM 104. In this way, a variety of additional components used in the prior art EDFA are avoided along with the costs of handling them and assembling them. An EDFA made with a source according to the invention avoids the beating problem because each pump source provides optical power at a tightly controlled wavelength and more importantly, the wavelength is configurable based upon the design of the pump source. For example, when the source is designed, the single laser source produces multiple optical signals that will likely result in beating in operation. Since the source supports many wavelengths, the wavelengths that it produces are configured to avoid the beating issue. Typically, this practice is avoided due to the prohibitive cost of individual laser sources however, using this technique the source is designed to provide a wide variety of optical pump signals in the 1480 nm range and therefore, the source is easily set to provide the desired pump signal.

Figure 11:
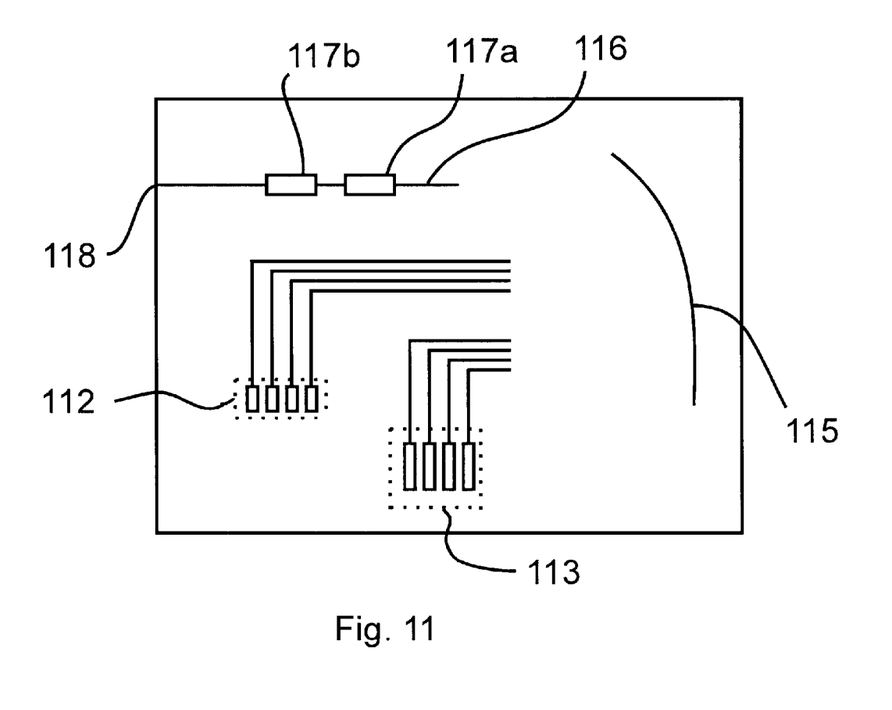
FIG. 11 is a pump source for providing light proximate 980 nm and 1480 nm from a same output port; and, FIG. 12 is a pump source for providing light proximate 980 nm and 1480 nm from separate output ports.

Referring to FIG. 11, a multiwavelength pump source according to the invention is shown. In this embodiment, the pump source is designed to provide light at a variety of wavelengths associated with 980 nm pumping and another variety of wavelengths associated with 1480 nm pumping. A first set of light sources 112 provides light for 980 nm pumping. Each of the light sources provides light at a different predetermined wavelength. All such wavelengths are proximate 980 nm. Similarly, a second set of light sources 113 provides light associated with 1480 nm pumping. Each of these light sources provides light at a different predetermined wavelength proximate 1480 nm. Each of the light sources for supporting either 980 nm pumping and 1480 nm pumping includes a reflector. Light provided by the various sources propagates to the grating 115 that provides the light to the waveguide 116. The light then propagates along waveguide 116 until it reaches the 1480 nm partial reflector 117*a.* Light having a wavelength proximate 1480 nm is partially reflected and, thus a portion of the light continues propagating along the waveguide. The region optically disposed between the 1480 nm partial reflector and the reflectors of the 1480 nm sources form lasing cavities. The light that penetrates the 1480 nm partial reflector propagates to the 980 nm partial reflector 117*b.* Light having a wavelength proximate 980 nm is partially reflected and, thus a portion of the light continues propagating to the output port 118. In this way, a simple laser source that provides light at a first variety of wavelengths proximate 980 nm and a second variety of wavelengths at 1480 nm is produces from a single optical chip. This is highly advantageous for an amplifier module that supports both Raman and EDFA amplification.

Additionally, the source described with reference to FIG. 11 is useable as an inexpensive replacement pump laser for prior art EDFA modules and prior art Raman amplifier modules. The sources that support those wavelengths that are not needed are simply not activated. Thus, although the pump source supports many wavelengths proximate 980 nm and 1480 nm it is quite possible to provide light at only one of these wavelengths using this type of pump source. Thus the invention reduces the need for storing a wide variety of replacement pump laser sources. This is advantageous because it reduces costs associated with maintenance. A first set of light sources 112 provides light for 980 nm pumping. Each of the light sources provides light at a different predetermined wavelength. All such wavelengths are proximate 980 nm.

Figure 12:
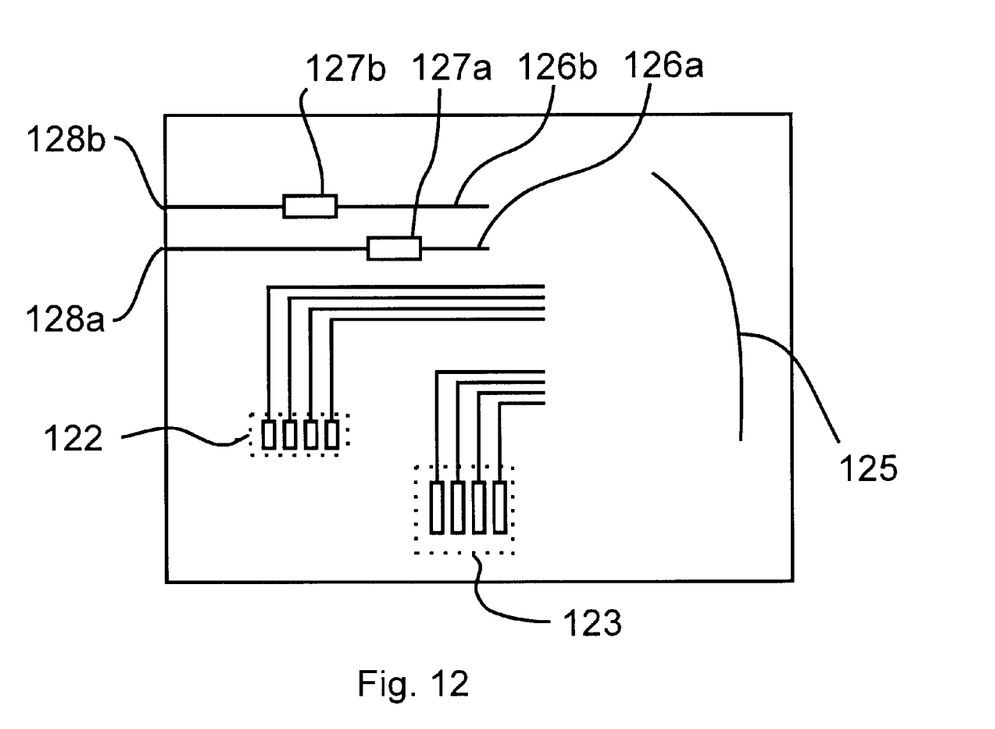

Referring to FIG. 12, a multiwavelength pump source according to the invention is shown. This embodiment features a first output port 128*a* for providing a pump signal having wavelengths associated with optical pumping in the 1480 nm range. The second output port 128*b* is for providing a second pump signal having wavelength associated with optical pumping in the 980 nm range. Light source 122 provide light associated with 980 nm pumping. Similarly, a second set of light sources 123 provides light associated with 1480 nm pumping. Each of these light sources provides light at a different predetermined wavelength proximate 1480 nm. Each of the light sources for supporting either 980 nm pumping and 1480 nm pumping includes a reflector. Light provided by the various sources propagates to the grating 125. Light provided by sources 123 is directed by the grating 125 to the waveguide 126*a*. Light provided by sources 122 is directed by the grating 125 to the waveguide 126*b*. Light propagating along waveguide 126*a* from the grating 125 will reach the 1480 nm partial reflector 127*a*. A portion of the light will propagate through the reflector 127*a* while another portion propagates back to the grating. Light propagating through the reflector 127*a* propagates to the output port 128*a*. Similarly, light propagating along waveguide 126*b* from the grating 125 will reach the 980 nm partial reflector 127*b*. A portion of the light will propagate through the reflector 127*b* while another portion propagates back to the grating. Light propagating through the reflector 127*b* propagates to the output port 128*b*. This embodiment is highly advantageous for a hybrid Raman and EDFA amplifier module because typically, the Raman amplification pump signal often propagates in a direction opposite the direction of the EDFA pump signal. Additionally, since the device provides a significant amount of optical power, providing two output ports distributes the output power.

A person of skill in the art of optical amplifiers will realize that the pump sources provide only those wavelengths that are desired. In this way, it is possible to replace a prior art pump source Numerous other embodiments may be envisioned without departing from the spirit or scope of the invention.

What is claimed is:

1. A multifrequency Raman pump laser cavity comprising, a plurality of light sources having a gain medium associated therewith for radiating at frequencies for Raman amplification each for providing laser light at a different frequency and spatially oriented in relation to an angular dispersive element such that light emitted from each source is reflected from the angular dispersive element toward a same output port and at least two partially reflecting coatings for forming a laser cavity therebetween wherein the angular dispersive element is one of within the laser cavity and defining a boundary thereto wherein at least two of the plurality of laser diode sources, the angular dispersive element and the at least two partially reflecting coatings are disposed on a same substrate.

2. A multifrequency Raman pump laser cavity according to claim 1 additionally comprising a second output port; said first output port for receiving a wavelength multiplexed optical signal wherein light received by the first output port is provided to the second output port.

3. A multifrequency Raman pump laser cavity according to claim 2 wherein light received at the first output port is provided to a coupler integrated on the same substrate.

4. A multifrequency Raman pump laser cavity according to claim 1 wherein the angular dispersive element is an echelle grating.

5. A multifrequency Raman pump laser cavity according to claim 1 wherein the substrate is an InP substrate.

6. A multifrequency EDFA pump laser cavity comprising, a plurality of light sources having a gain medium associated therewith for radiating at frequencies for EDFA amplification each for providing laser light at a different frequency and spatially oriented in relation to an angular dispersive element such that light emitted from each source is reflected from the angular dispersive element toward a same output port and at least two partially reflecting coatings for forming a laser cavity therebetween wherein the angular dispersive element is one of within the laser cavity and defining a boundary thereto wherein at least two of the plurality of laser diode sources, the angular dispersive element and the at least two partially reflecting coatings are disposed on a same substrate.

7. A multifrequency EDFA pump laser cavity according to claim 6 additionally comprising an input port for receiving a wavelength multiplexed optical signal wherein light received by the input port is provided to the same output port.

8. A multifrequency EDFA pump laser cavity according to claim 7 wherein light received at the input port is provided to a coupler integrated on the same substrate.

9. A multifrequency EDFA pump laser cavity according to claim 6 wherein the angular dispersive element is an echelle grating.

10. A multifrequency EDFA pump laser cavity according to claim 6 wherein the substrate is an InP substrate.

11. A multifrequency pump laser cavity comprising, a plurality of light sources having a gain medium associated therewith for radiating at a first set of frequencies for EDFA amplification and a second set of frequencies for Raman amplification each for providing laser light at a different frequency and spatially oriented in relation to an angular dispersive element such that light emitted from each source is reflected from the angular dispersive element toward a same output port; and, at least three partially reflecting coatings for forming a laser cavity therebetween wherein the angular dispersive element is one of within the laser cavity and defining a boundary thereto wherein at least two of the plurality of laser diode sources, the angular dispersive element and the at least three partially reflecting coatings are disposed on a same substrate.

12. A multifrequency pump laser cavity according to claim 11 additionally comprising an input port for receiving a wavelength multiplexed optical signal wherein light received by the input port is provided to the same output port.

13. A multifrequency pump laser cavity according to claim 12 wherein light received at the input port is provided to a coupler integrated on the same substrate.

14. A multifrequency pump laser cavity according to claim 11 wherein the angular dispersive cyclic element is an echelle grating.

15. A multifrequency EDFA pump laser cavity according to claim 11 wherein the substrate is an InP substrate.

16. A multifrequency Raman pump laser cavity according to claim 1 comprising a variable optical attenuator disposed such that in use, the variable optical attenuator is in optical communication with at least one light source of the plurality of light sources, the variable optical attenuator disposed on the same substrate.

17. A multifrequency Raman pump laser cavity according to claim 16 comprising a set of variable optical attenuators disposed on the same substrate such that, each of the variable optical attenuators is associated with a light source of the plurality of light sources and, in use, the each of the variable optical attenuators is for selectably attenuating light provided by an associated light source.

18. A multifrequency EDFA pump laser cavity according to claim 6 comprising a variable optical attenuator disposed such that in use, the variable optical attenuator is in optical communication with at least one light source of the plurality of light sources, the variable optical attenuator disposed on the same substrate.

19. A multifrequency EDFA pump laser cavity according to claim 18 comprising a set of variable optical attenuators disposed on the same substrate such that, each of the variable optical attenuators is associated with a light source of the plurality of light sources and, in use, the each of the variable optical attenuators is for selectably attenuating light provided by an associated light source.

20. A multifrequency pump laser cavity according to claim 11 comprising a variable optical attenuator disposed such that in use, the variable optical attenuator is in optical communication with at least one light source of the plurality of light sources, the variable optical attenuator disposed on the same substrate.

21. A multifrequency pump laser cavity according to claim 20 comprising a set of variable optical attenuators disposed on the same substrate such that, each of the variable optical attenuators is associated with a light source of the plurality of light sources and, in use, the each of the variable optical attenuators is for selectably attenuating light provided by an associated light source.

* * * * *